C. F. JOY.
HARNESS SADDLE.
APPLICATION FILED MAY 13, 1908.

1,093,188.

Patented Apr. 14, 1914.

Witnesses:

Inventor:
Charles F. Joy
By William S. Alwood
Atty.

UNITED STATES PATENT OFFICE.

CHARLES F. JOY, OF NORTH ATTLEBORO, MASSACHUSETTS.

HARNESS-SADDLE.

1,093,188. Specification of Letters Patent. Patented Apr. 14, 1914.

Application filed May 13, 1908. Serial No. 432,641.

*To all whom it may concern:*

Be it known that I, CHARLES F. JOY, a citizen of the United States, and a resident of North Attleboro, county of Bristol, State of Massachusetts, have invented an Improvement in Harness-Saddles, of which the following description, in connection with the accompanying drawings, is a specification, like characters on the drawings representing like parts.

My invention relates to harness saddles and aims generally to provide a saddle having simple and effective means for effectually preventing injury to or galling of the back of the horse on which it is employed. The above, however, together with other features and objects characterizing my invention, will be best understood and appreciated by reference to the following description when considered in connection with the accompanying drawings of a saddle embodying one form of my invention and selected for purposes of illustration, the scope of the invention being more particularly pointed out and defined in the appended claims.

Figure 1:
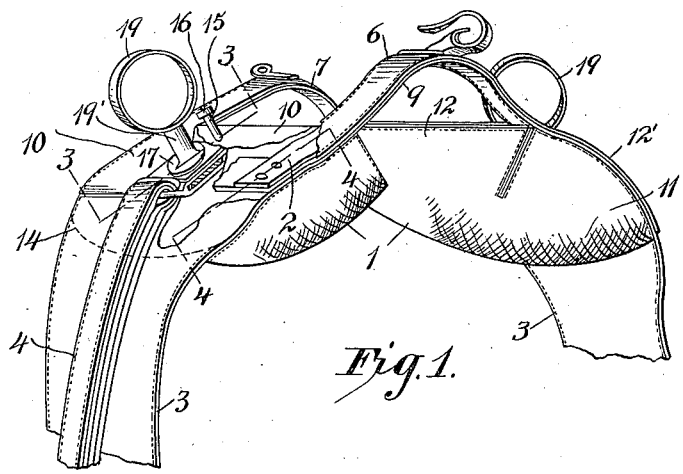
Figure 3:
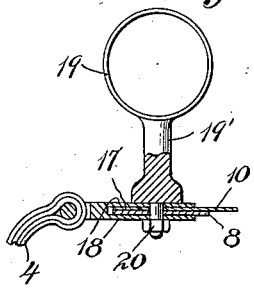
Figure 4:
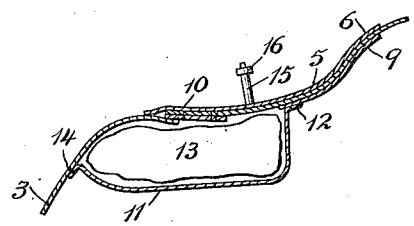
Figure 2:
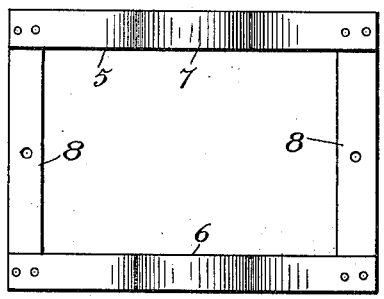

In the drawings: Figure 1 is a perspective view with parts broken away or removed, of a harness saddle embodying a preferred form of my invention and selected for purposes of illustration; Fig. 2 is a plan of the metal tree employed; Fig. 3, an enlarged vertical section taken on the line 3—3 Fig. 1 and illustrating the manner of connecting the thill tug bearing straps to the tree; and Fig. 4 is a similar section taken on the line 4—4 Fig. 1.

Referring to the drawings and to the embodiment of my invention therein selected for illustration (see Fig. 1,) my invention provides a saddle of the open back or bifurcated type, which at its under side, has suitable covered pads 1, Fig. 1 that are adapted to fit and rest upon the horse's back and form the only contacting surfaces therewith, so that no other part of the saddle touches the horse and the rubbing, friction of movable parts, etc., characteristic of the usual type of saddle and tending to produce sores, is entirely eliminated.

The saddle, as herein shown, comprises a preferably metallic tree 2, shown in detail in Fig. 2, carrying at its under side the pair of pads, 1, one at each side of the tree. The tree and its pads are protected, in the present instance, by incasing them in leather and the skirts 3 of the saddle are suitably secured to the lower portions of the leather casing, the back straps 4 being directly connected to the saddle tree.

An important feature of my invention resides in the particular construction of the tree 2, as shown in Fig. 2. This preferably comprises strips 5, preferably of metal, which intermediate their ends, are respectively provided with arched portions 6 and 7. When the saddle is in place on the horse's back, these arches curve over and above the back bone of the horse, so that no frictional contact can take place therewith. The end portions of these arched strips are bent down or shaped to conform to the curvature of the back of the horse and the adjacent lower ends of these strips are connected by the horizontal cross strips 8, each being herein shown as riveted thereto, so as to provide a rigid tree frame of substantially rectangular outline as shown in Fig. 2. The front arch 6, Figs. 1 and 2 has a smaller radius of curvature and is much higher than the rear arch, which is of larger radius of curvature and consequently of less height. By this construction the parts of the tree are rigidly connected and are prevented from relative movement, so that when the completed saddle is in place on the horse's back teetering or sawing movement of the saddle as a whole or its parts relative to one another is eliminated and the consequent chafing and galling of the horse's back prevented. Both arches of the tree are incased in leather, as at 9, the edges being herein shown as stitched at the sides. These covers may be extensions of suitable top and bottom leather covers 10, 11 respectively, with which the saddle is provided. The top leather covers 10 over-lie the flat end portions of the arch strips and their riveted connecting strips 8 and are substantially rectangular in shape. The bottom edges of these covers overlap and are secured preferably by a horizontal line of stitches to the adjacent upper edges of the saddle skirts 3, the latter being preferably brought up against the lower edges of the cross strips 8. The two leather facings or cover portions 11—11, for the under side of the tree are cut sufficiently large to cover and inclose the pads. The upper edges of the lower covers 11 are secured, preferably by horizontal lines of stitches 12, to the corresponding and adjacent top edge of the overlying top facing 10. The lateral edges of the top and bottom covers are also secured together preferably by stitching as shown at 12′ and the two pads 13, are thus inclosed and held in place between the facings which present pockets therefor. The flat portions of the tree form a rigid support or backing for the edge or lateral portions of the pads and retain them in operative relation with the lower or bottom face of the saddle. The lower edge of each of the lower covers or facings, 11, is also suitably secured to the skirt 3, as by the line of stitches shown at 14, which aid in confining the pads in fixed position.

While any desired construction of pads may be used, in the present instance, I preferably employ pneumatic pads of the inflatable rubber bag type, 13, each being provided with a valve stem 15, and valve 16, the stem extending through a fitting aperture in the upper cover of the saddle. By this construction the symmetry and pleasing appearance of the saddle is preserved and the valve stem is placed in a position where it will not interfere with the movement of the reins or other parts of the harness and where it is also conveniently accessible for the purpose of inflating the pad. The saddle is also provided with the usual terret rings 19, each bolted through the cover to the central portion of the cross strip 8.

The thill tug bearing straps 4 of the saddle are each connected in a novel manner with the saddle tree. The connection here shown preferably comprises a metal loop strap or casting 17, Fig. 3, having upper and lower members or arms 18 eyed at their ends. The two arms are separated sufficiently to embrace the adjacent cross strip, 8, of the tree and the leather top covers 10, and are secured thereto by the shank 19 of the terret ring bolt which is first threaded through the eyed end of the upper arm, then through an aperture in the strip and finally through the eye of the lower arm. The end of the bolt is threaded to receive a nut 20 which is turned or set up to secure the parts in place. In inserting the lower arm, 18, of the loop strap a suitable opening or slit is made between the upper edge of the skirt and the adjacent stitched edge of the top cover.

A saddle of the construction described rests naturally upon the back of the horse on which it is employed and where the lower leather covered surfaces of the two yielding pads contact the horse's back. By this construction, furthermore the number of parts required to produce an efficient saddle is greatly reduced and it will also be apparent that a possible pull on the saddle effected by pulling on the reins or by the thill tugs does not produce any sawing or friction movement of the saddle.

The front arch of the saddle has the usual water hook over which the check rein is looped and the lower back arch a hook for the crupper loop. As this latter arch extends or is raised above the back of the horse, the crupper loop is also raised above the latter, so that no movable parts of the harness touch the horse except at desired points.

My invention thus provides a harness saddle that is not only strong, cheap and durable, but is of sufficient resiliency to yield to the stress of the saddle girth and hence fit accurately upon the horse's back, the yielding nature of the separated pads, the open back, the specific construction of the tree with its arches of two heights and different curvatures, and the connections with the thill tug bearing straps and crupper strap contributing to prevent any teetering, sawing, or friction movement of the saddle, so that galling the animal's back or abrasion of the skin or other discomfiture, due to the saddle, is eliminated or prevented. The provision of the shaped tree furthermore preserves the shape of the saddle so that it always maintains uniform contact.

My invention is not limited to the construction of the embodiment herein selected for the purpose of illustration, nor to the specific details of construction and arrangement, the same being capable of modification within wide limits without departing from the spirit and scope thereof.

I claim:

1. A harness saddle comprising a tree, the framework of which consists of transverse forward and rear arched strips and cross strips rigidly connecting the ends of the transverse strips, the forward strip being more abruptly arched than the rear strip, covering pieces overlying the ends of the arched strips and the cross-connecting strips, extensions from said covers lying along the arched strips and stitched around the edges thereof, saddle skirts stitched to the outer edges of the upper covers, under covers stitched to the upper covers and to said saddle skirts and cut full to provide pockets, and pneumatic pads contained within said pockets.

2. A harness saddle comprising an open metal frame-work including arched members arranged to extend across the backbone of the animal and end cross members, pads underlying the ends of the frame and adapted to rest on the back of the animal at each side of the backbone, leather straps and pieces overlying and covering the members of the frame, under covers inclosing the pads and connected to the aforesaid leather covers, skirts secured to said covers, a metal casting having upper and lower arms embracing one of the cross strips of the frame, said arms and the strip having apertures, a terret ring bolt having a shank passing through said apertures, a nut screwed upon the end of the shank whereby the casting is fastened to the frame, and a thill tug bearing strap held by said casting.

3. In a harness saddle, a metal tree frame comprising a pair of strips each provided with an arched portion between its ends, connecting strips for uniting the adjacent ends of said strips, a pair of terret rings each having its shank tapped through the adjacent connecting strip, thill tug bearing straps having connecting loops each provided with a pair of eyed arms separated from one another sufficiently to embrace the adjacent connecting strip, the eyes of said arms receiving the shank of the adjacent terret ring, and a nut threaded on the lower end of said shank to clamp and secure the parts together.

4. An open back harness saddle, comprising in combination, a tree provided with a front strip having substantially straight end portions and a central arched portion, a rear arched strip having similar end portions and a central arch of less height and curvature, rigid connections between the end portions at each side of the saddle, protecting covers for the upper and lower faces of the flat end portions of the tree and said connections, resilient pads retained between said covers in supporting relation to said tree strips and thereby separated from one another, and a thill tug, a terret ring and a thill-tug-strap loop at each side of the saddle, said straps having arms embracing the rigid side connections of the saddle and the upper protecting cover thereof, and the rings having shanks passing through said arms and side connections to secure them together.

In testimony whereof, I have signed my name to this specification, in the presence of two subscribing witnesses.

CHARLES F. JOY.

Witnesses:
SIDNEY F. SMITH,
WILLIAM T. ATWOOD.

---

Copies of this patent may be obtained for five cents each, by addressing the "Commissioner of Patents, Washington, D. C."